United States Patent
Furuta

(10) Patent No.: US 10,232,822 B2
(45) Date of Patent: Mar. 19, 2019

(54) VEHICLE-MOUNTED COMMUNICATION SYSTEM, PORTABLE MACHINE, AND VEHICLE-MOUNTED MACHINE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Takuya Furuta, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/532,692

(22) PCT Filed: Nov. 17, 2015

(86) PCT No.: PCT/JP2015/082208
§ 371 (c)(1),
(2) Date: Jun. 2, 2017

(87) PCT Pub. No.: WO2016/088547
PCT Pub. Date: Jun. 9, 2016

(65) Prior Publication Data
US 2017/0349144 A1    Dec. 7, 2017

(30) Foreign Application Priority Data
Dec. 5, 2014  (JP) .................................. 2014-247119

(51) Int. Cl.
*B60R 25/24*    (2013.01)
*E05F 15/695*    (2015.01)
(Continued)

(52) U.S. Cl.
CPC ............ *B60R 25/241* (2013.01); *B60R 25/24* (2013.01); *B60J 1/17* (2013.01); *B60R 25/01* (2013.01);
(Continued)

(58) Field of Classification Search
CPC ....... B60R 25/241; B60R 25/01; B60R 25/24; E05B 81/54; E05F 15/695; E05F 15/77; B60J 1/17; E05Y 2900/55; G07C 9/00309
See application file for complete search history.

(56) References Cited

U.S. PATENT DOCUMENTS 6,567,012 B1    5/2003  Matsubara et al.
2002/0063623 A1*  5/2002  Juzswik .............. B60C 23/0408
                                                           340/442

(Continued)

FOREIGN PATENT DOCUMENTS

JP    H10-131569 A    5/1998
JP    H10-336760 A    12/1998
(Continued)

OTHER PUBLICATIONS

Machine English Translation for JP 10-336760A (Dec. 18, 1998)(Nishidai)(35 pages).*
(Continued)

*Primary Examiner* — Brian E Miller
(74) *Attorney, Agent, or Firm* — Honigman LLP

(57) ABSTRACT

Provided are a vehicle-mounted communication system with which a vehicle-mounted machine is able to continue receiving a wireless signal even if the signal is interrupted. When an ID signal, indicating identification information (ID) corresponding to a vehicle, and more than M (where M is a natural number) data signals, indicating control content, are caused to be included in a wireless signal by the portable machine, and the portable machine transmits the wireless
(Continued)

signal, the portable machine adds the ID signal into the wireless signal each time M data signals have been transmitted, and continues to transmit the wireless signal. Meanwhile, each time the vehicle-mounted machine receives the ID signal included in the wireless signal, the vehicle-mounted machine verifies the identification information the received ID signal against identification information stored in a ROM, and continues to receive the wireless signal when there is a match.

17 Claims, 8 Drawing Sheets

(51) Int. Cl.
  *B60J 1/17* (2006.01)
  *B60R 25/01* (2013.01)
  *E05B 81/54* (2014.01)
  *G07C 9/00* (2006.01)
  *E05F 15/77* (2015.01)

(52) U.S. Cl.
  CPC ............ *E05B 81/54* (2013.01); *E05F 15/695* (2015.01); *E05F 15/77* (2015.01); *E05Y 2900/55* (2013.01); *G07C 9/00309* (2013.01)

(56) References Cited

U.S. PATENT DOCUMENTS

| | | | |
|---|---|---|---|
| 2004/0041693 A1 | 3/2004 | Matsubara et al. | |
| 2004/0157558 A1 | 8/2004 | Ishiwatari | |
| 2006/0203726 A1 | 9/2006 | Neuman et al. | |
| 2007/0008084 A1* | 1/2007 | Wu | G08G 1/017 340/425.5 |
| 2007/0080779 A1* | 4/2007 | Tang | B60R 25/24 340/5.61 |
| 2009/0021370 A1* | 1/2009 | Fish | B60R 25/1003 340/539.13 |
| 2009/0178448 A1* | 7/2009 | Tamezane | B60R 25/2036 70/262 |
| 2014/0167915 A1* | 6/2014 | Tamada | G07C 9/00309 340/5.61 |
| 2015/0120151 A1* | 4/2015 | Akay | B60R 25/24 701/49 |
| 2015/0170444 A1* | 6/2015 | Yasui | G07C 9/00007 340/5.61 |
| 2015/0371472 A1* | 12/2015 | Kamiya | G07C 9/00309 340/5.61 |
| 2016/0063784 A1* | 3/2016 | Murakami | G07C 9/00309 340/5.61 |
| 2016/0180613 A1* | 6/2016 | Kishimoto | G07C 9/00944 340/5.61 |
| 2017/0203721 A1* | 7/2017 | Hamada | B60R 25/245 |

FOREIGN PATENT DOCUMENTS

| | | |
|---|---|---|
| JP | 2000-297568 A | 10/2000 |
| JP | 2003-262055 A | 9/2003 |
| JP | 2004-241932 A | 8/2004 |
| JP | 2006-270946 A | 10/2006 |
| JP | 2010-114684 A | 5/2010 |
| JP | 2015-078523 A | 4/2015 |

OTHER PUBLICATIONS

Search Report for International Application No. PCT/JP2015/082208, dated Feb. 16, 2016, 4 pp.

* cited by examiner

VEHICLE-MOUNTED COMMUNICATION SYSTEM, PORTABLE MACHINE, AND VEHICLE-MOUNTED MACHINE

CROSS-REFERENCE TO RELATED APPLICATIONS

This application is the U.S. national stage of PCT/JP2015/082208 filed Nov. 17, 2015, which claims priority of Japanese Patent Application No. JP 2014-247119 filed Dec. 5, 2014.

TECHNICAL FIELD

The present invention relates to a vehicle-mounted communication system, and to a portable machine and a vehicle-mounted machine constituting the vehicle-mounted communication system.

BACKGROUND

Most recent vehicles are now equipped with keyless entry systems, which make it possible to lock and unlock the doors of a vehicle by operating a portable machine (a remote operation key) without needing to lock/unlock the mechanical locks of the doors. Such remote operations often use ultra-high frequency waves (UHF), which have a short propagation distance and are weak, and the portable machine transmits a wireless signal obtained by modulating a carrier wave with information including identification information set for each particular vehicle. A vehicle-mounted machine that has received the wireless signal from the portable machine demodulates the wireless signal, verifies the obtained identification information against stored identification information, and locks/unlocks a door if there is a match.

In addition to locking/unlocking doors, some keyless entry systems can control vehicle-mounted devices aside from the doors, depending on the state of the vehicle-mounted device and the content of the wireless signal from the portable machine.

For example, JP-10-131569A discloses a keyless entry system that raises/lowers power windows in the case where the operation of an operation switch of a portable machine is started within a first amount of time after all doors have been locked/unlocked and the operation then continues for more than a second amount of time.

The portable machine of this keyless entry system transmits a wireless signal including a header, a portable machine-unique ID (identification information), a control code of the operation switch (control information), and a continuous operation code indicating the operation time of the operation switch, in that order. The continuous operation code is transmitted continuously as long as the continuous operation time of the operation switch does not exceed a limit.

However, with the technique disclosed in JP-10-131569A, other wireless signals transmitted between other portable machines and vehicle-mounted machines, external noise such as electromagnetic pulses, and the like may intermix with the wireless signal transmitted from the portable machine to the vehicle-mounted machine and temporarily interrupt the reception of the wireless signal by the vehicle-mounted machine. In such a case, it is difficult for the vehicle-mounted machine to continue the reception. Specifically, once the reception is resumed, the received wireless signal will not contain the ID, and thus the vehicle-mounted machine will ignore that wireless signal. There is thus a problem in that the reception of a wireless signal cannot be continued if that wireless signal has been interrupted.

Having been achieved in light of such circumstances, it is an object of the present invention to provide a vehicle-mounted communication system with which a vehicle-mounted machine is able to continue receiving a wireless signal even if the signal is interrupted while the vehicle-mounted machine is receiving the wireless signal from a portable machine, as well as the portable machine and the vehicle-mounted machine constituting the vehicle-mounted communication system.

SUMMARY OF THE INVENTION

A vehicle-mounted communication system according to an aspect of the present invention is a vehicle-mounted communication system including a portable machine and a vehicle-mounted machine. The portable machine transmits a wireless signal including an ID signal expressing identification information corresponding to a vehicle and one or more data signals expressing control content relating to a vehicle-mounted device. The vehicle-mounted machine controls the vehicle-mounted device on the basis of the ID signal and data signal included in the wireless signal received from the portable machine. In the case where the portable machine transmits the wireless signal including the ID signal and more than M (where M is a natural number) of the data signals, the portable machine is configured to further add the ID signal every M data signals and continue the transmission. The vehicle-mounted machine is configured to continue receiving the wireless signal on the basis of the ID signals included in the wireless signal being received.

A portable machine according to an aspect of the present invention is a portable machine that transmits a wireless signal including an ID signal expressing identification information corresponding to a vehicle and one or more data signals expressing control content relating to a vehicle-mounted device. The portable machine is configured to: transmit, for a time T1 before the wireless signal, a first startup signal; and in the case of transmitting a wireless signal including the ID signal and more than M (where M is a natural number) of the data signals, further include the ID signal every M data signals, and insert a second startup signal for a time T3 before further including the ID signal and continuing the transmission of the wireless signal.

A vehicle-mounted machine according to an aspect of the present invention is a vehicle-mounted machine that receives a wireless signal including an ID signal expressing identification information corresponding to a vehicle and one or more data signals expressing control content relating to a vehicle-mounted device, and controls the vehicle-mounted device on the basis of the data signal included in the received wireless signal. The vehicle-mounted machine is configured to: be able to receive the first startup signal and the wireless signal following the first startup signal in a period of a time T2; be able to receive a second startup signal and the wireless signal following the second startup signal in a period of a time T4 (where T4<T2) in the case where the wireless signal following the first startup signal, and the ID signal and the data signal, have been received; and continue receiving the wireless signal on the basis of the ID signal included in the wireless signal being received.

The present invention can be realized not only as a vehicle-mounted communication system, a portable machine, and a vehicle-mounted machine including such characteristic processing units, but also as a vehicle communication method that takes the characteristic processes as steps, a program for causing a computer to execute such steps, and so on. The present invention can also be realized as a semiconductor integrated circuit that realizes part or all of the vehicle-mounted communication system, the portable machine, and the vehicle-mounted machine, and as another system including the vehicle-mounted communication system, the portable machine, and the vehicle-mounted machine.

Advantageous Effects of Invention

According to the foregoing, the vehicle-mounted machine confirms whether the plurality of ID signals included in the wireless signal are correct each time during the reception of a wireless signal including more than M data signals (where M is a natural number), and then continues receiving the wireless signal.

Accordingly, even in the case where the reception of a wireless signal from the portable machine is interrupted for the vehicle-mounted machine, the vehicle-mounted machine can continue to receive the wireless signal.

DETAILED DESCRIPTION OF THE PREFERRED EMBODIMENTS

Figure 1:
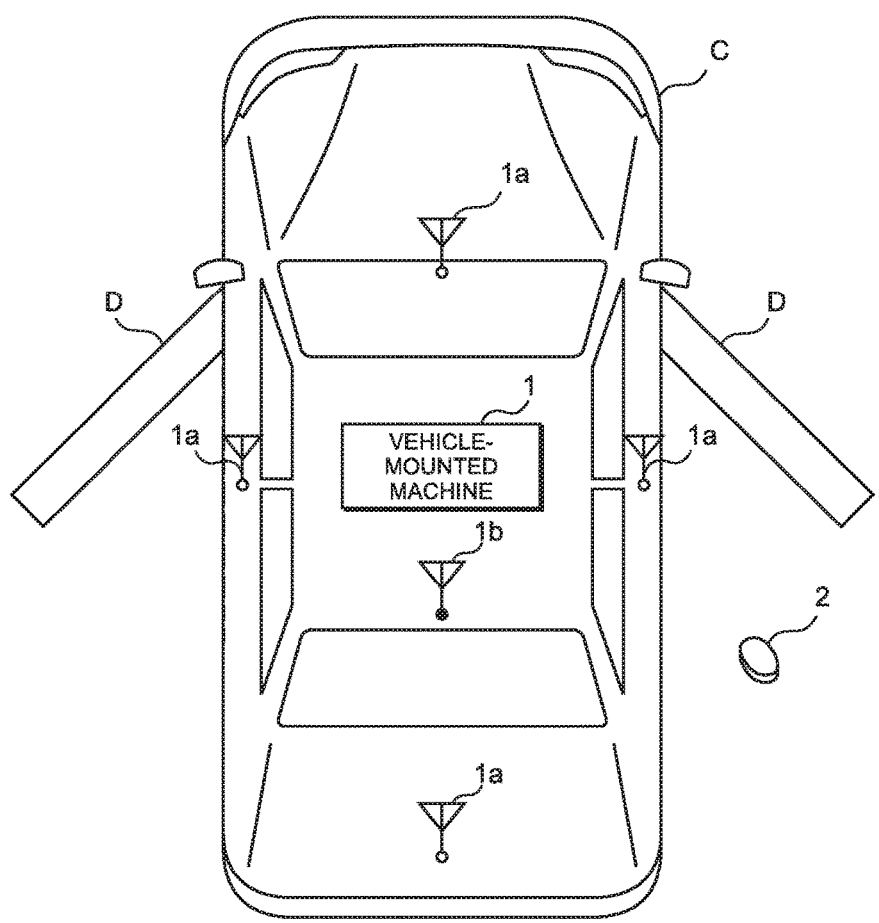
FIG. 1 is a schematic diagram illustrating an example of the configuration of a vehicle-mounted communication system according to an embodiment.

First, embodiments of the present invention will be described as examples.

(1) A vehicle-mounted communication system according to an aspect of the present invention is a vehicle-mounted communication system including a portable machine and a vehicle-mounted machine. The portable machine transmits a wireless signal including an ID signal expressing identification information corresponding to a vehicle and one or more data signals expressing control content relating to a vehicle-mounted device. The vehicle-mounted machine controls the vehicle-mounted device on the basis of the ID signal and data signal included in the wireless signal received from the portable machine. In the case where the portable machine transmits the wireless signal including the ID signal and more than M (where M is a natural number) of the data signals, the portable machine is configured to further add the ID signal every M data signals and continue the transmission. The vehicle-mounted machine is configured to continue receiving the wireless signal on the basis of the ID signals included in the wireless signal being received.

According to the present application, in the case where the ID signal indicating the identification information corresponding to the vehicle, and M of the data signals (where M is a natural number) indicating the control content relating to the vehicle-mounted device, are included in a wireless signal and transmitted by the portable machine, the portable machine further includes the ID signal every M data signals (in other words, after M data signals) and then transmits the wireless signal. Meanwhile, the vehicle-mounted machine continues receiving the wireless signal on the basis of the received ID signal, with each reception of the ID signal included in the wireless signal being received.

Accordingly, the vehicle-mounted machine uses the plurality of ID signals included in the wireless signal to confirm whether or not the portable machine is correct each time during the reception of a wireless signal including more than M data signals, and continues receiving the wireless signal.

(2) Preferably, the vehicle-mounted machine is configured to, in the case where the vehicle-mounted machine has received a wireless signal including more than N (where N is a natural number satisfying N≥M) of the data signals, carry out control that is different from the control carried out in the case where a wireless signal including N or fewer of the data signals has been received.

According to the present application, each time the ID signal included in the wireless signal is received during the reception of a wireless signal including more than M data signals, the vehicle-mounted machine continues to receive the wireless signal on the basis of the received ID signal. As a result, in the case where a wireless signal including more than N (where N≥M) data signals has been received, different control is carried out compared to a case where a wireless signal including N or fewer data signals has been received.

Accordingly, the reception of a wireless signal including more than N data signals can be continued as appropriate, and control corresponding to the more than N data signals can be carried out.

(3) Preferably, the portable machine is configured to transmit, for a time T1 before the wireless signal, a first startup signal for causing the vehicle-mounted machine to receive the wireless signal; and the vehicle-mounted machine is configured to be able to receive the first startup signal and the wireless signal following the first startup signal in a period of a time T2 (where T2≤T1).

According to the present application, the portable machine transmits the wireless signal including the ID signal and the data signal after first transmitting the first startup signal, for causing the vehicle-mounted machine to receive the wireless signal, for the time T1. Meanwhile, the vehicle-mounted machine stands by for the first startup signal in a period of the time T2 (where T2≤T1), and becomes able to receive the wireless signal following the first startup signal by receiving the first startup signal that has arrived while the vehicle-mounted machine is standing by.

Accordingly, the vehicle-mounted machine transitions to a so-called sleep mode in the period of the time T2, for example, and this reduces the consumed power. Meanwhile, the portable machine can put the vehicle-mounted machine, which has transitioned to the sleep mode, into a reception-capable state and cause the vehicle-mounted machine to receive the wireless signal.

(4) Preferably, the portable machine is configured to insert and transmit, for a time T3, a second startup signal for causing the vehicle-mounted machine to continue to receive the wireless signal, before further including the ID signal and continuing transmission; and the vehicle-mounted machine is configured to be able to receive the second startup signal and the wireless signal following the second startup signal in a period of a time T4 (where T4<T2 and T4≤T3) in the case where the vehicle-mounted machine has received the wireless signal following the first startup signal and has received the ID signal and the data signal.

According to the present application, before continuing to transmit the wireless signal including the added ID signals, the portable machine inserts the second startup signal, for causing the vehicle-mounted machine to continue to receive the wireless signal currently being received, and transmits that second startup signal for the time T3. Meanwhile, in the case where the vehicle-mounted machine has received the ID signal and the data signal included in the wireless signal that follows the first startup signal as a result of receiving the first startup signal that has arrived while the vehicle-mounted machine is standing by, the vehicle-mounted machine enters a state of standing by for the second startup signal in a period of the time T4 (where T4<T2 and T4≤T3). The vehicle-mounted machine can receive the wireless signal following the second startup signal by receiving the second startup signal that has arrived while the vehicle-mounted machine is standing by.

Accordingly, even in the case where the reception is temporarily interrupted while the vehicle-mounted machine is receiving the wireless signal, the reception of the wireless signal following the second startup signal can be continued. Meanwhile, the portable machine can put the vehicle-mounted machine, which is standing by for the second startup signal, into a reception-capable state and cause the vehicle-mounted machine to continue to receive the wireless signal.

(5) Preferably, the time T3 satisfies a condition of T3<T1.

According to the present application, the time T3 for which the portable machine transmits the second startup signal is shorter than the time T1 for which the portable machine transmits the first startup signal (T3<T1).

Accordingly, the reception interval for the two data signals received by the vehicle-mounted machine before and after the second startup signal is shortened due to the time T3 being shortened.

(6) Preferably, the vehicle-mounted machine is configured to end the reception of the wireless signal in the case where the ID signal and the data signal to be included in the wireless signal being received have not been received for greater than or equal to a time T5 that is longer than a transmission interval of the second startup signal.

According to the present application, in the case where the period in which the vehicle-mounted machine does not receive the ID signal and the data signals while the wireless signal is being received continues for greater than or equal to the time T5, which is longer than the transmission interval of the second startup signal, the vehicle-mounted machine ends the reception of the wireless signal and prepares to receive a new wireless signal.

Accordingly, the vehicle-mounted machine detects the end of reception of the wireless signal upon the time T5 passing following the reception of the newest data signal. Additionally, in the case where the time for which the reception of the ID signal and the data signals is interrupted is less than the time T5, the wireless signal can continue to be received.

(7) Preferably, the vehicle-mounted machine is configured to be able to receive the first startup signal and the wireless signal following the first startup signal in the period of the time T2 in the case where the ID signal and the data signal to be included in the wireless signal being received have not been received for greater than or equal to a time T6 (where T6>T5).

According to the present application, in the case where the period for which the ID signal and the data signals are not received while receiving the wireless signal continues for greater than or equal to the time T6, the vehicle-mounted machine enters the state of standing by for the first startup signal in the period of the time T2. Then, upon receiving the first startup signal that has arrived while the vehicle-mounted machine is standing by, the vehicle-mounted machine enters a state in which the wireless signal following the first startup signal can be received.

Accordingly, the vehicle-mounted machine can return from a state of standing by for the second startup signal, to the state of standing by for the first startup signal in the period of the time T2, after the time T6 has passed following the reception of the newest data signal.

(8) Preferably, the portable machine is configured to, in the case of transmitting a wireless signal including a plurality of data signals, add information that sequentially increases or decreases to each of the data signals and then transmit the wireless signal.

According to the present application, in the case where a plurality of data signals are included in the wireless signal transmitted by the portable machine, information that sequentially increases or decreases is added to each data signal.

Accordingly, even in the case where the reception of the wireless signal is temporarily interrupted, the vehicle-mounted machine can know the number of data signals included in the wireless signal on the basis of the data signal received last.

(9) A portable machine according to an aspect of the present invention is a portable machine that transmits a wireless signal including an ID signal expressing identification information corresponding to a vehicle and one or more data signals expressing control content relating to a vehicle-mounted device. The portable machine is configured to: transmit, for a time T1 before the wireless signal, a first startup signal; and in the case of transmitting a wireless signal including the ID signal and more than M (where M is a natural number) of the data signals, further include the ID signal every M data signals, and insert a second startup signal for a time T3 before further including the ID signal and continuing the transmission of the wireless signal.

According to the present application, the wireless signal is transmitted after first transmitting the first startup signal, for causing the vehicle-mounted machine to receive the wireless signal, for the time T1. Then, in the case of transmitting the ID signal expressing identification information corresponding to the vehicle and more than M data signals expressing the control content relating to the vehicle-mounted device in the wireless signal, the second startup signal for causing the vehicle-mounted machine to continue receiving the wireless signal is inserted for the time T3 every M data signals (in other words, after M data signals), the ID signal is then added, and the transmission of the wireless signal is continued.

Accordingly, for example, the vehicle-mounted machine, which has transitioned to the sleep mode, is put into a reception-capable state and caused to receive the wireless signal. Additionally, the vehicle-mounted machine, which is standing by for the second startup signal, is put into a reception-capable state and is caused to continue to receive the wireless signal. The vehicle-mounted machine is then caused to confirm whether the portable machine is correct each time on the basis of the plurality of ID signals included in the wireless signal.

(10) A vehicle-mounted machine according to an aspect of the present invention is a vehicle-mounted machine that receives a wireless signal including an ID signal expressing identification information corresponding to a vehicle and one or more data signals expressing control content relating to a vehicle-mounted device, and controls the vehicle-mounted device on the basis of the data signal included in the received wireless signal. The vehicle-mounted machine is configured to: be able to receive the first startup signal and the wireless signal following the first startup signal in a period of a time T2; be able to receive a second startup signal and the wireless signal following the second startup signal in a period of a time T4 (where T4<T2) in the case where the wireless signal following the first startup signal, and the ID signal and the data signal, have been received; and continue receiving the wireless signal on the basis of the ID signal included in the wireless signal being received.

According to the present application, the vehicle-mounted machine stands by for the first startup signal in the period of the time T2, and becomes able to receive the wireless signal following the first startup signal by receiving the first startup signal that has arrived while the vehicle-mounted machine is standing by. Then, in the case where the vehicle-mounted machine has received the ID signal and the data signal included in the wireless signal that follows the first startup signal, the vehicle-mounted machine enters a state of standing by for the second startup signal in a period of the time T4 (where T4<T2). The vehicle-mounted machine can receive the wireless signal following the second startup signal by receiving the second startup signal that has arrived while the vehicle-mounted machine is standing by. Then, the vehicle-mounted machine continues receiving the wireless signal on the basis of the received ID signal with each reception of the ID signal included in the wireless signal being received.

Accordingly, the vehicle-mounted machine transitions to a so-called sleep mode in the period of the time T2, for example, and this reduces the consumed power. Additionally, even in the case where the reception is temporarily interrupted while the vehicle-mounted machine is receiving the wireless signal and the ID signal and the data signal are not being received, the reception of the wireless signal following the second startup signal can be continued. Then, the vehicle-mounted machine uses the plurality of ID signals included in the wireless signal to confirm whether or not the portable machine is correct each time, and continues receiving the wireless signal.

A specific example of the vehicle-mounted communication system according to an embodiment of the present invention will be described hereinafter with reference to the drawings. Note that the present invention is not intended to be limited to these examples, and is defined instead by the scope of the appended claims. All changes that fall within the same essential spirit as the scope of the claims are intended to be included therein as well. The technical features disclosed in the embodiment can be combined with each other as well.

Embodiment

FIG. 1 is a schematic diagram illustrating an example of the configuration of the vehicle-mounted communication system according to the embodiment. The vehicle-mounted communication system according to the present embodiment includes a vehicle-mounted machine 1 and a portable machine 2. The vehicle-mounted machine 1 transmits and receives various types of signals using a plurality of LF transmission antennae 1a and an RF reception antenna 1b provided in a vehicle C. The portable machine 2 transmits and receives various types of signals to and from the vehicle-mounted machine 1. In the present embodiment, the portable machine 2 particularly transmits signals requesting vehicle doors D provided in plural in the vehicle C to lock/unlock or windows to be raised/lowered to the vehicle-mounted machine 1.

Figure 2:
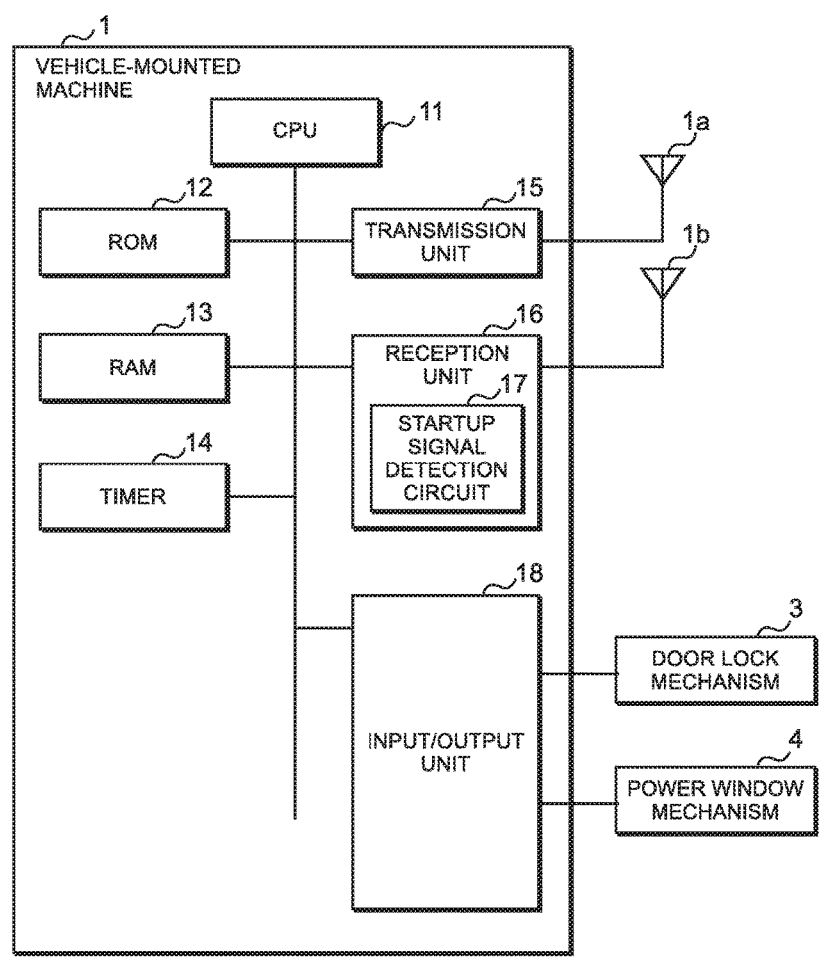
FIG. 2 is a block diagram illustrating an example of the configuration of a vehicle-mounted machine.
Figure 3:
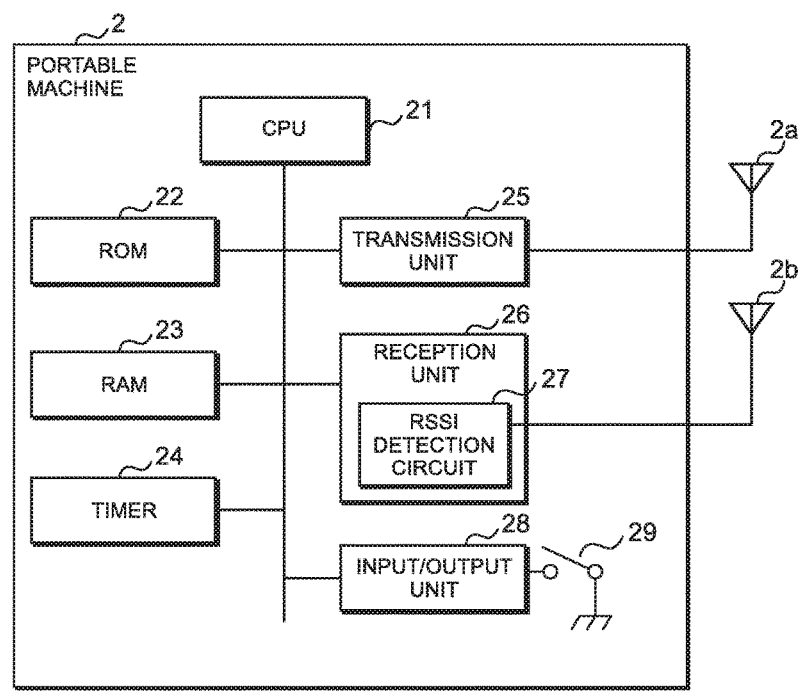
FIG. 3 is a block diagram illustrating an example of the configuration of a portable machine.

FIG. 2 is a block diagram illustrating an example of the configuration of the vehicle-mounted machine 1, and FIG. 3 is a block diagram illustrating an example of the configuration of the portable machine 2. The vehicle-mounted machine 1 illustrated in FIG. 2 includes a central processing unit (CPU) 11 serving as the center of various types of control performed in the vehicle-mounted machine 1. The CPU 11 is connected by a bus to a ROM 12 storing control programs, information such as identification information (ID) unique to the portable machine 2 corresponding to the vehicle C; a RAM 13 that stores temporarily-occurring information; and a timer 14 for measuring various times.

A transmission unit 15 that transmits signals using low-frequency (LF) band radio waves over the LF transmission antennae 1a, a reception unit 16 that receives, over the RF reception antenna 1b, signals transmitted using ultra-high frequency (UHF) band radio waves, and an input/output unit 18 for interfacing with a door lock mechanism 3 and a power window mechanism 4 provided in the vehicle C, are connected to the CPU 11 by the bus. The plurality of LF transmission antennae 1a are provided, for example, in a front part of the vehicle C, in a back door, on a driver's seat side pillar, and on a passenger's seat side pillar. The location of the RF reception antenna 1b is not particularly limited.

The transmission unit 15 is connected to the plurality of LF transmission antennae 1a, and transmits signals for determining the current position of the portable machine 2, for example, under the control of the CPU 11. However, these signals are not used in the present embodiment.

The reception unit 16 is connected to the RF reception antenna 1b, and includes a startup signal detection circuit 17 that detects a first startup signal and a second startup signal among signals inputted from the RF reception antenna 1b. A detection result from the startup signal detection circuit 17 is acquired by the CPU 11 via the reception unit 16 as appropriate, but the detection result may instead be communicated to the CPU 11 by an interrupt.

The reception unit 16 is configured to be capable of switching between a sleep state (a so-called sleep mode) in which the reception unit 16 has its own power consumption reduced, and an active state in which wireless signals including ID signals and data signals, which will be described later, can be received, under the control of the CPU 11. The startup signal detection circuit 17 can detect the first startup signal and the second startup signal even during the sleep state.

The door lock mechanism 3 is provided in the vicinity of each of the vehicle doors D in the vehicle C, and includes a mechanical mechanism for locking/unlocking the vehicle door D, an actuator for electrically operating the mechanical mechanism, and so on. The door lock mechanism 3 locks/unlocks the vehicle door D by operating the mechanical mechanism through actuator operations made via the input/output unit 18, under the control of the CPU 11.

The power window mechanism 4 is provided within each of the vehicle doors D in the vehicle C, and includes a mechanical mechanism for raising/lowering a window, a motor for electrically operating the mechanical mechanism, and so on. The power window mechanism 4 raises/lowers the window by operating the mechanical mechanism through rotational operations of the motor via the input/output unit 18, under the control of the CPU 11.

Moving to FIG. 3, the portable machine 2 includes a CPU 21 serving as the center of various types of control performed in the portable machine 2. The CPU 21 is connected by a bus to a ROM 22 storing control programs, information such as identification information (ID) unique to the portable machine 2 corresponding to the vehicle C; a RAM 23 that stores temporarily-occurring information; and a timer 24 for measuring various times.

A transmission unit 25 that transmits signals using UHF band radio waves over an RF transmission antenna 2a, a reception unit 26 that receives, over an LF reception antenna 2b, signals transmitted using LF band radio waves, and an input/output unit 28 for obtaining on/off signals from an operation switch 29 disposed in a main body part of the portable machine 2, are connected to the CPU 21 by the bus.

The transmission unit 25 is connected to the RF transmission antenna 2a installed in the main body part of the portable machine 2, and under the control of the CPU 21, transmits the first startup signal and the second startup signal, and a wireless signal requesting the vehicle doors D to be locked/unlocked or the windows to be raised/lowered.

The reception unit 26 is connected to the LF reception antenna 2b, and includes an RSSI detection circuit 27 that detects a Received Signal Strength Indicator (RSSI) of a signal inputted from the LF reception antenna 2b. The reception unit 26 receives signals from the vehicle-mounted machine 1 for determining the current position of the portable machine 2, for example. However, these signals are not used in the present embodiment.

In the vehicle-mounted communication system configured as described above, upon an on signal of the operation switch 29 being obtained via the input/output unit 28, the CPU 21 of the portable machine 2 uses the transmission unit 25 and the RF transmission antenna 2a to transmit the first startup signal and a wireless signal requesting the vehicle doors D to be locked/unlocked. In the case where the on signal of the operation switch 29 continues to be obtained while the wireless signal is being transmitted, the second startup signal is inserted and the length of the wireless signal being transmitted is extended, such that the wireless signal becomes a signal requesting the windows to be raised/lowered.

Figure 4:
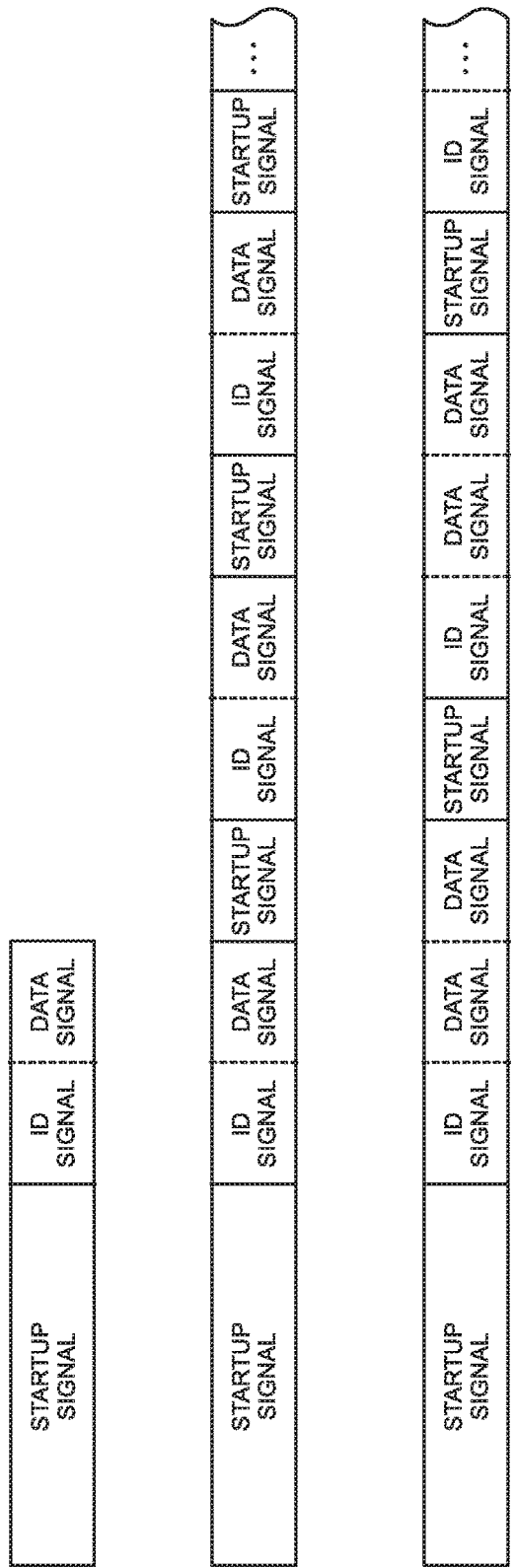
FIG. 4 is a descriptive diagram illustrating the structure of a wireless signal requesting a vehicle door to be locked/unlocked and windows to be raised/lowered.

FIG. 4 is a descriptive diagram illustrating the structure of a wireless signal requesting the vehicle doors D to be locked/unlocked and windows to be raised/lowered. The wireless signal in the upper section of the diagram requests the vehicle doors D to be locked/unlocked, and is transmitted when the operation switch 29 is depressed for a comparatively short amount of time (called a "short press"). Having received this wireless signal, the vehicle-mounted machine 1 controls the vehicle doors D to toggle between locking and unlocking (called a "first process" hereinafter). This wireless signal follows the first startup signal (denoted as a "startup signal" in the drawing), and is constituted of an ID signal and a single data signal. The first startup signal has a length of 200 ms, for example (the lengths of signals will similarly be denoted in terms of time hereinafter), and the combined length of the ID signal and the data signal is 80 ms, for example. Two or more ID signals may be included as well.

The wireless signals in the middle and lower sections of FIG. 4 are both signals requesting the windows to be raised/lowered, and are transmitted in the case where the operation switch 29 has been depressed for a comparatively long amount of time (called a "long press"). Having received these wireless signals while the vehicle doors D are locked/unlocked, the vehicle-mounted machine 1 causes the windows to be raised/lowered, for example (called a "second process" hereinafter). These wireless signals follow the first startup signal, and are constituted of a plurality of combinations of the ID signal and M (where M is a natural number; M=1 in the middle section of the drawing, and M=2 in the lower section of the drawing) data signals. The second startup signal (denoted as a "startup signal" in the drawing) is inserted between each combination. The second startup signal is 50 ms in length, for example.

Generally speaking, in the case where the vehicle-mounted machine 1 has received a number of data signals in the wireless signal equivalent to a first prescribed value prescribing a number greater than or equal to M and less than or equal to N (where N is a natural number satisfying N≥M), the vehicle-mounted machine 1 executes the above-described first process; and in the case where the vehicle-mounted machine 1 has received a number of the data signals equivalent to a second prescribed value prescribing a number greater than N, the vehicle-mounted machine 1 executes the above-described second process. For example, in the case where M=1 and N=M, the first prescribed value=M=1, and the second prescribed value=N+1=2, the first process is executed when the wireless signal indicated in the upper section of FIG. 4 has been received, and the second process is executed upon the second data signal being received when the wireless signal indicated in the middle section of FIG. 4 has been received.

Note that in the case where N is greater than M, the first prescribed value may be a number less than or equal to N and greater than M; however, in the present embodiment, the first prescribed value=M. Accordingly, in the case where the signal indicated in the lower section of FIG. 4 has been transmitted when the operation switch 29 has been long-pressed in the portable machine 2, M=2, and thus the first prescribed value is prescribed as 2. In this case, N may be taken as 3 and the second prescribed value prescribed as 4, or N may be taken as 5, 7, and so on, and the second prescribed value prescribed as 6, 8 and so on.

The first startup signal and the second startup signal are modulated waves obtained by modulating a carrier wave using, for example, a modulation signal in which data of 0s and is alternate or a modulation signal containing random data. The following assumes that the first startup signal and the second startup signal have lengths of a time T1 and a time T3, respectively.

The ID signal is a modulated wave obtained by modulating a carrier wave using identification information unique to the portable machine 2 corresponding to the vehicle C as the transmission content (modulation signal). In the case where a wireless signal has been received by the vehicle-mounted machine 1, identification information indicated by reception content (demodulation signal) obtained by demodulating the ID signal constituting the wireless signal is verified against identification information stored in the ROM 12 of the vehicle-mounted machine 1, and a wireless signal that does not match is ignored (discarded).

The data signal is a modulated wave obtained by modulating a carrier wave using control information indicating control details for a vehicle-mounted device of the vehicle C as the transmission content (modulation signal). The "control information" referred to here is fixed information indicating locking/unlocking of the vehicle doors D. In the case where, for example, a lock switch and an unlock switch are provided instead of the operation switch 29 of the portable machine 2, information indicating that the vehicle doors D are to be locked or unlocked depending on the depressed switch may be used as the control information. In this case, the vehicle-mounted machine 1 locks or unlocks the vehicle doors D in accordance with the control information indicated by the demodulation signal corresponding to the data signal constituting the received wireless signal.

In addition to the control information, information serving as a serial number of the data signal may be included in the content transmitted when the carrier wave is modulated to produce the data signal. Furthermore, a cyclic redundancy check (CRC) code may be added to the information to serve as the transmission content when the carrier wave is modulated to produce the ID signal and the data signal. Further still, information obtained by applying predetermined encryption to the information to which the CRC code has been added may be used as the transmission content.

In the present embodiment, the CPU 11 of the vehicle-mounted machine 1 sets the reception unit 16 to the sleep state and searches, every period equivalent to the time T2 (T2≤T1), for whether or not the first startup signal has been detected. The search period is not longer than the first startup signal, and thus it is highly likely that the transmitted first startup signal will be detected while the search is underway. In the case where the first startup signal has been detected, the CPU 11 sets the reception unit 16 to the active state and receives the ID signal and data signal following the first startup signal.

In the case where the ID signal and the data signal have been received, the CPU 11 once again sets the reception unit 16 to the sleep state and searches, every period equivalent to the time T4 (T4<T2 and T4≤T3), for whether or not the second startup signal has been detected. The search period is not longer than the second startup signal, and thus it is highly likely that the transmitted second startup signal will be detected while the search is underway. In the case where the second startup signal has been detected, the CPU 11 sets the reception unit 16 to the active state and receives the ID signal and data signal following the second startup signal.

In this manner, the ID signal and the data signal are received successively. In this case, the ID signal is received before the data signal. As such, the identification information contained in the ID signal is verified, and the correctness of the control information contained in the following data signal (in other words, that the control information contained in the data signal corresponds to the portable machine 2) is confirmed. Additionally, the detection of the second startup signal is continually searched for between an ID signal and data signal, and the ID signal and data signal that follow thereafter, and thus even in the case where the reception of the wireless signal is interrupted, it is easy to resume that reception.

Furthermore, the first startup signal and the ID signal are regularly inserted between data signals. As such, counting the number of times the data signal is received on the vehicle-mounted machine 1 side makes it possible to back-calculate the time for which the operation switch 29 is continually depressed on the portable machine 2, which in turn makes it possible to control the vehicle-mounted device in accordance with the back-calculated time. In the present embodiment, the length of the second startup signal, which is the time T3, is a short 50 ms, and thus the data signal transmission interval can be kept to 130 ms (=50 ms+80 ms) at a maximum. This makes it possible to make the error relative to the above-described back-calculated time comparatively low.

Operations of the above-described vehicle-mounted machine 1 and portable machine 2 will be described hereinafter using flowcharts illustrating those operations.

Figure 5:
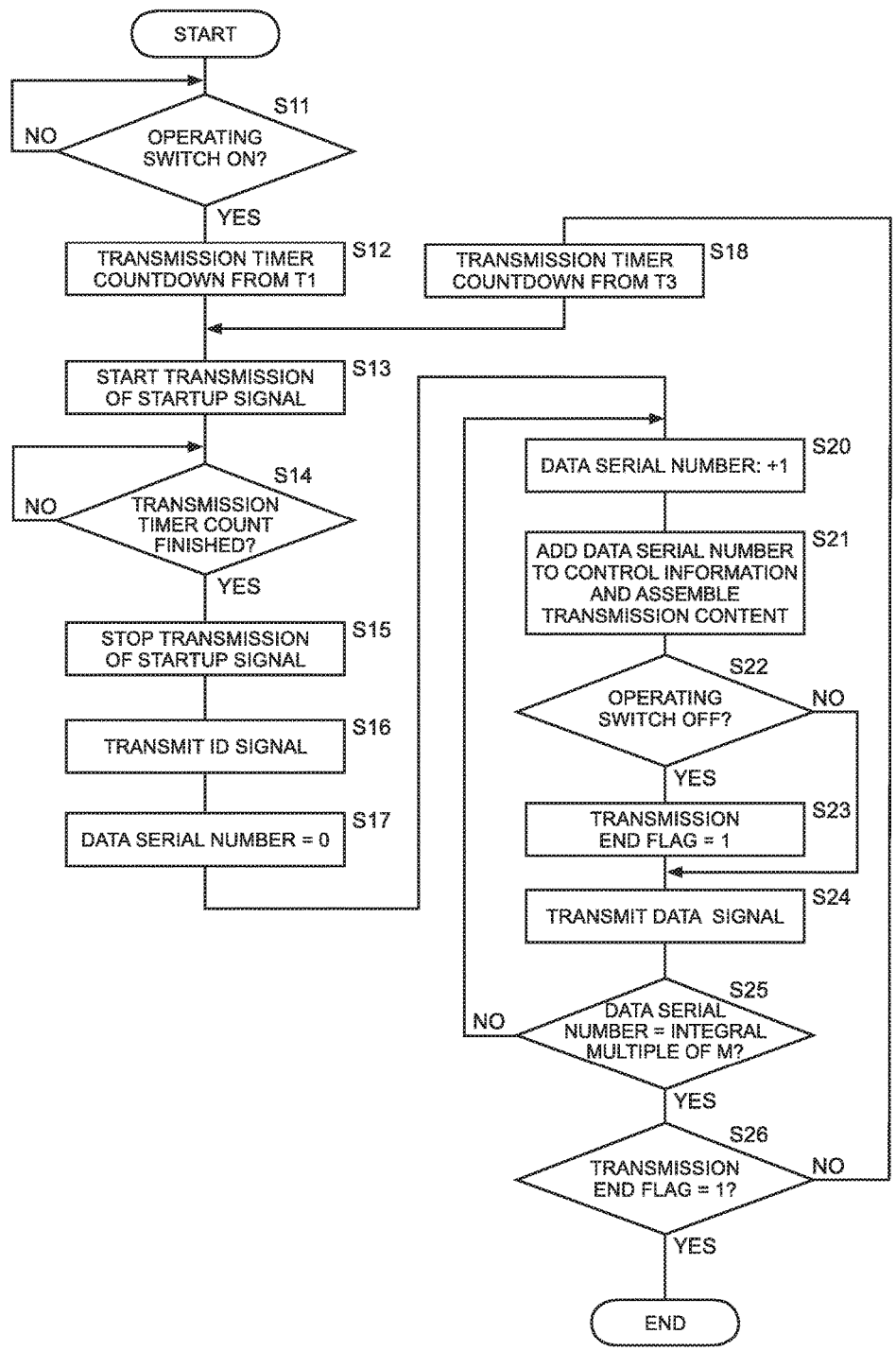
FIG. 5 is a flowchart illustrating a processing sequence performed by a CPU that controls the transmission of wireless signals by the portable machine.
Figure 6:
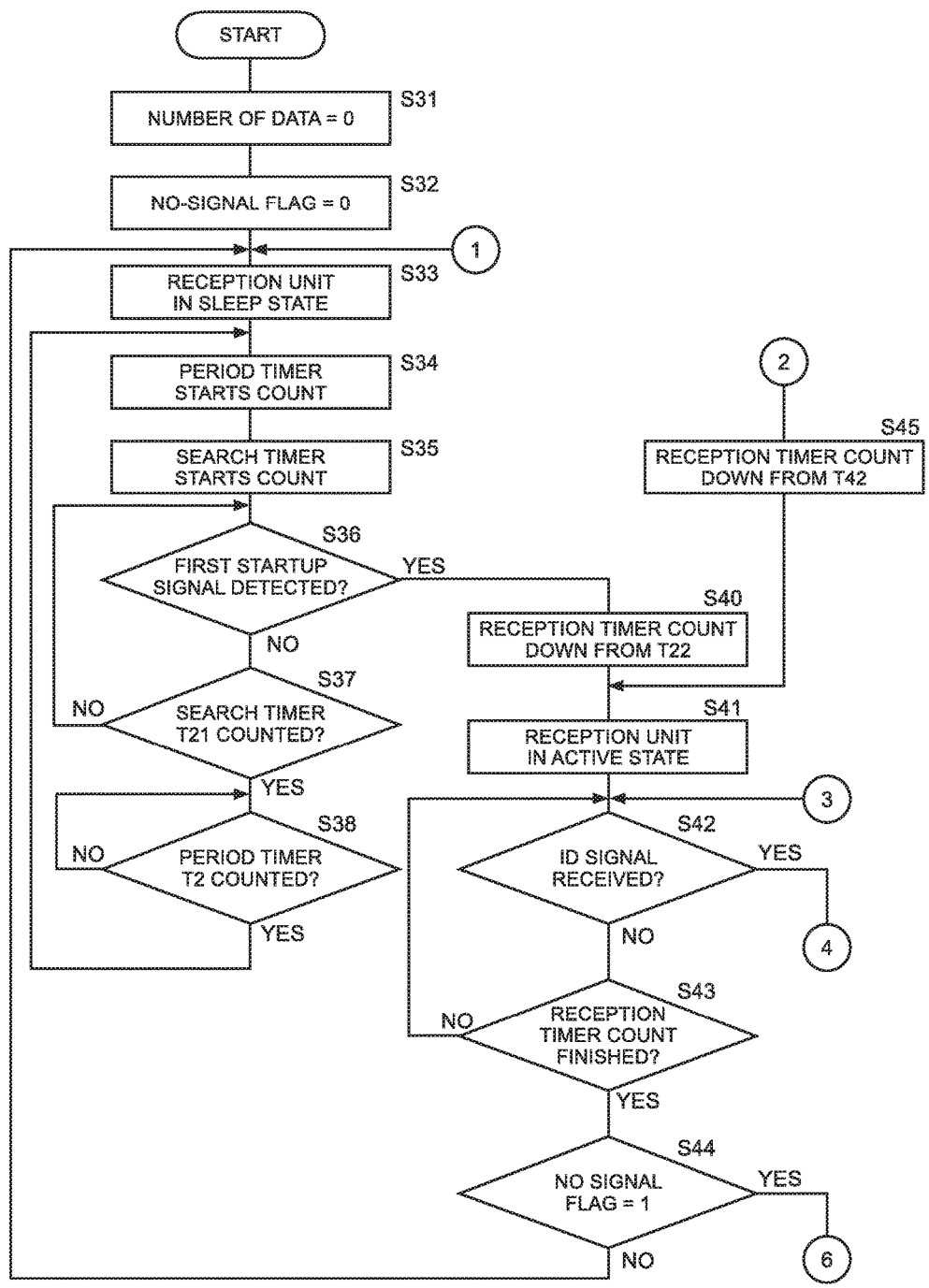
FIG. 6 is a flowchart illustrating a processing sequence performed by a CPU that controls the reception of wireless signals by the vehicle-mounted machine.
Figure 7:
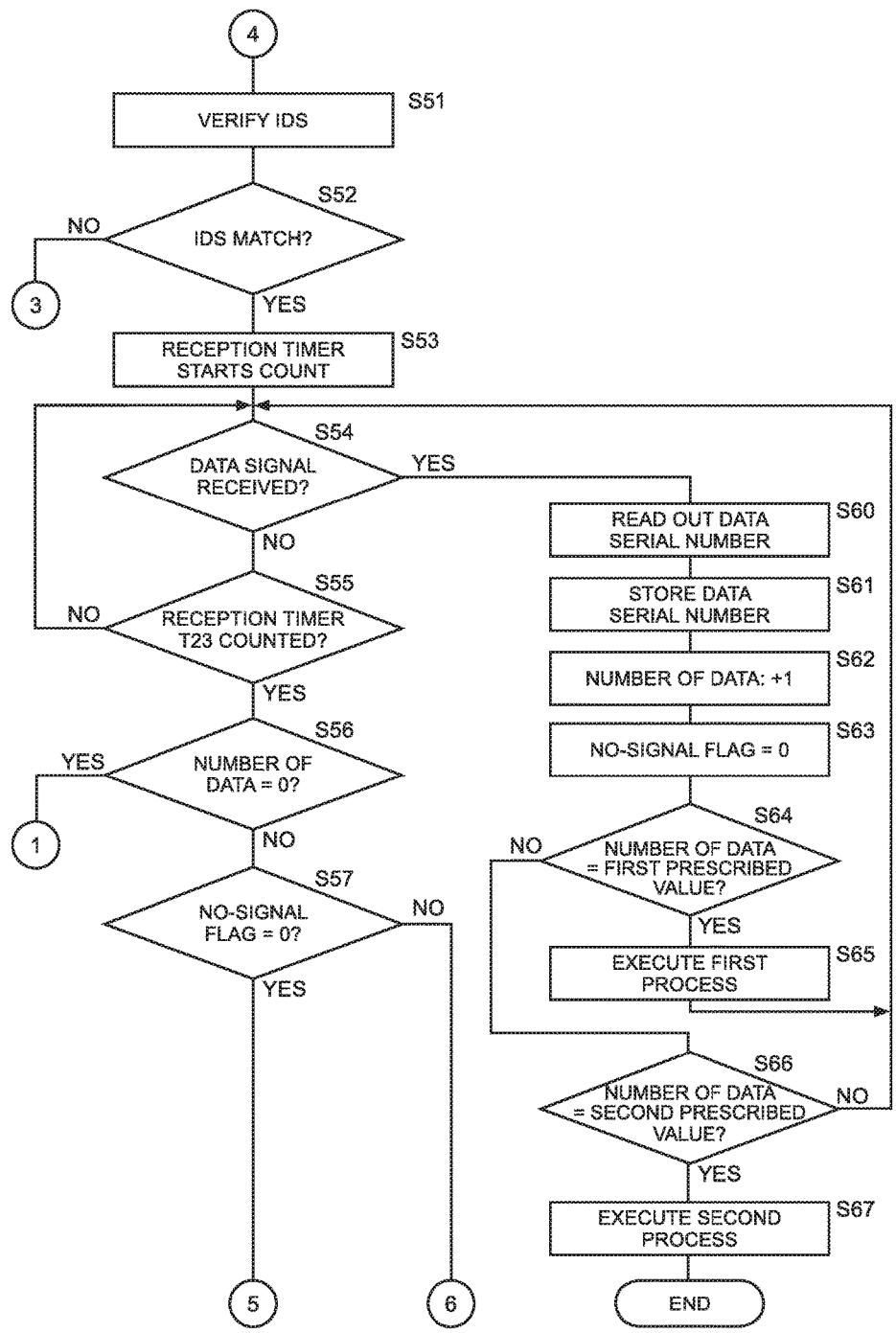
FIG. 7 is a flowchart illustrating a processing sequence performed by a CPU that controls the reception of wireless signals by the vehicle-mounted machine.
Figure 8:
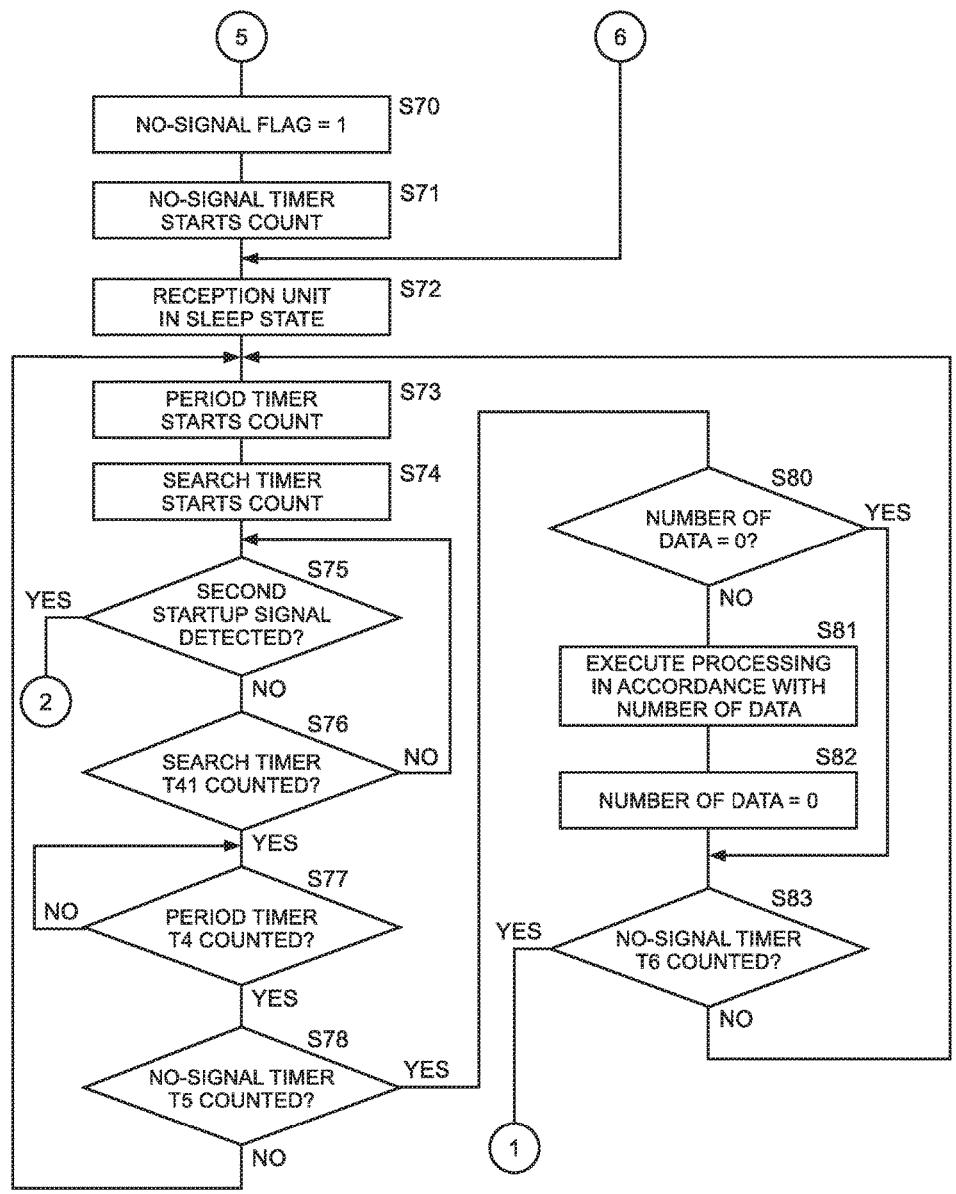
FIG. 8 is a flowchart illustrating a processing sequence performed by a CPU that controls the reception of wireless signals by the vehicle-mounted machine.

FIG. 5 is a flowchart illustrating a sequence of processing carried out by the CPU 21, which controls the transmission of wireless signals in the portable machine 2. FIGS. 6, 7, and 8 are flowcharts illustrating sequences of processing carried out by the CPU 11, which controls the reception of wireless signals in the vehicle-mounted machine 1.

The processing illustrated in FIG. 5 is started as appropriate after the portable machine 2 has finished transmitting a wireless signal. The "data serial number" indicated in FIG. 5 is information serving as a serial number of the data signal, and is stored in the RAM 23 along with a "transmission end flag". The initial value of the "transmission end flag" is cleared to 0.

The processing illustrated in FIG. 6 is started as appropriate after the vehicle-mounted machine 1 has finished receiving a wireless signal. The "number of data", "no-signal flag", and "data serial number" indicated in FIGS. 6, 7, and 8 are stored in the RAM 13.

In the case where the processing illustrated in FIG. 5 has been started by the portable machine 2, the CPU 21 determines whether or not the operation switch 29 is on (S11). In the case where the operation switch 29 is not on (S11: NO), the CPU 21 stands by until the operation switch 29 is depressed and turns on. In the case where the operation switch 29 is on (S11: YES), the CPU 21 starts a countdown from time T1 as a transmission timer, using the timer 24 (S12). After this, the transmission unit 25 starts the transmission of the first startup signal (S13). A case where the transmission of the second startup signal is started in this step will be described later. In the present embodiment, the only difference between the first startup signal and the second startup signal is the lengths of the transmitted signals, and thus no distinction is made between the two in FIG. 5.

Then, the CPU 21 determines whether or not the transmission timer has finished counting (S14). In the case where the transmission timer has not finished counting (S14: NO), the CPU 21 stands by until the count is finished. In the case where the transmission timer has finished counting (S14: YES), the CPU 21 stops transmitting the first startup signal using the transmission unit 25 (S15). In the case where the process has moved from step S18, described later, to step S13, and the transmission of the second startup signal has been started, the transmission of the second startup signal is thus stopped in step S15.

Next, the CPU 21 reads out the identification information (ID) stored in the ROM 22, converts the read-out identification information into transmission content (a modulation signal), and transmits the ID signal using the transmission unit 25 (S16). In this case, the CRC code may be added to the identification information. Then, the CPU 21 sets the data serial number, serving as the serial number of the data signals in the single wireless signal, to 0 (S17), and stores the data serial number in the RAM 23. The data serial number may be information that increases progressively or information that decreases progressively, or the data serial number may not be added at all.

Next, the CPU 21 increments the data serial number stored in the RAM 23 by 1 (S20), and then assembles the transmission content by adding the data serial number to the control information indicating whether to lock/unlock the vehicle doors D (S21). Furthermore, the CPU 21 determines whether or not the operation switch 29 is off (S22), and in the case where the operation switch 29 is off (S22: YES), or in other words, in the case where the operation switch 29 is not being depressed, the CPU 21 sets the transmission end flag to 1 (S23).

In the case where the operation switch 29 is not off (S22: NO), that is, in the case where the operation switch 29 remains depressed, or in the case where the process of step S23 has ended, the CPU 21 uses the transmission unit 25 to transmit a single data signal as a modulation signal of the assembled transmission content (S24). The CRC code may be added to the transmission content before transmission as well.

Next, the CPU 21 determines whether or not the data serial number stored in the RAM 23 is an integral multiple of M (where M is a natural number) (S25). The value of M is the number of data signal to be transmitted successively, and is 1 or 2 in the example illustrated in FIG. 4. This determination is a determination as to whether or not the continuous transmission of the data signals should be put on hold.

In the case where the data serial number is not an integral multiple of M (S25: NO), the CPU 21 moves the process to step S20 to continue on to transmit the data signal. On the other hand, in the case where the data serial number is an integral multiple of M (S25: YES), the CPU 21 determines whether or not the transmission end flag is 1 (S26).

In the case where the transmission end flag is not 1 (S26: NO), the CPU 21 starts the countdown from time T3 for the transmission timer using the timer 24 (S18), and then moves the process to step S13, in order to continue on to transmit the second startup signal. The transmission of the second startup signal is started in step S13. On the other hand, in the case where the transmission end flag is 1 (S26: YES), the CPU 21 ends the processing illustrated in FIG. 5. This ends the transmission of the wireless signal.

Although the lengths of the first startup signal and the second startup signal are determined by the transmission times thereof in the flowchart indicated in FIG. 5, it should be noted that these lengths may be determined by the number of bits transmitted.

Before moving to FIG. 6, an overview of the flow of processing illustrated in FIGS. 6, 7, and 8 will be given. FIG. 6 includes a process in which a search for the result of detecting the first startup signal prior to the wireless signal is repeated periodically every time T2, and a process in which a determination for receiving the ID signals following the first startup signal and the second startup signal is repeated for time T22 and T42. In particular, the no-signal flag is set to 1 in the case where the determination for receiving the ID signal following the second startup signal is repeated.

FIG. 7 includes a process for determining whether an ID (identification signal) matches, a process of repeating the determination for receiving the data signal following the ID signal for time T23 in the case where there is an ID match, a process of reading out information included in the received data signal, writing the information into the RAM 13, and so on, and a process to be executed in accordance with the number of received data signals. The no-signal flag is cleared to 0 in the case where a data signal is received at this time.

FIG. 8 includes a process of repeating a search for the result of detecting the second startup signal following the data signal every time T4, a process of monitoring a period in which the data signal is not received (in other words, a period in which the no-signal flag is set to 1) for time T5 and time T6, a process in which the reception of the wireless signal is ended upon time T5 passing, to be executed in accordance with the number of data signal received by that point in time, and a process of moving to step S33, near the beginning of FIG. 6, in order to carry out the search for the result of detecting the first startup signal upon time T6 passing.

In the case where the process of FIG. 6 has been started in the vehicle-mounted machine 1, the CPU 11 sets the number of data indicating the number of received data signals to 0 (S31) and stores that number of data in the RAM 13. The CPU 11 also clears the no-signal flag, indicating that following data signal has not been received in the reception process sequence illustrated in FIGS. 7 and 8, to 0 (S32).

Then, the CPU 11 sets the reception unit 26 to the low-power consumption sleep state (S33), starts the count of a period timer using the timer 14 (S34), and furthermore starts the count of a search timer (S35). Here, the period timer counts a period in which a search for a result of detecting the first startup signal is repeated while waiting for the first startup signal, whereas the search timer counts an amount of time for which the result of detecting the first startup signal is searched for while the reception unit 26 is in the sleep state.

Next, the CPU 11 searches for the result of detecting the first startup signal by the startup signal detection circuit 17, and determines whether or not the first startup signal has been detected (S36). In the case where the first startup signal has not been detected (S36: NO), the CPU 11 determines whether or not the search timer has counted time T21 (S37). The time T21 is a time around 10 ms, for example. In the case where the search timer has not counted the time T21 (S37: NO), the CPU 11 moves the process to step S36 in order to repeat the search for the result of detecting the first startup signal.

In the case where the search timer has counted the time T21 (S37: YES), the CPU 11 determines whether or not the period timer has counted the time T2 (300 ms, for example) (S38), and in the case where the period timer has not counted the time T2 (S38: NO), stands by until the time T2 has been counted. On the other hand, in the case where the period timer has counted the time T2 (S38: YES), the CPU 11 moves the process to step S34 to search for the result of detecting the first startup signal once again.

In step S36, in the case where the first startup signal has been detected (S36: YES), the CPU 11 starts a countdown from time T22 for a reception timer, using the timer 14 (S40), and then sets the reception unit 26 to the active state (S41). Here, the reception timer is a timer for monitoring from when the first startup signal is detected to when the ID signal is received. The time T22 is a time around 250 ms, for example.

After this, the CPU 11 determines whether or not the ID signal has been received by the reception unit 26 (S42). In the case where the ID signal has been received (S42: YES), the process moves to step S51 (see FIG. 7), which will be described later. However, in the case where the ID signal has not been received (S42: NO), the CPU 11 determines whether or not the reception timer has finished counting (S43).

In the case where the reception timer has not finished counting (S43: NO), the CPU 11 moves the process to step S42 in order to repeat the determination as to whether or not the ID signal has been received. However, in the case where the reception timer has finished counting (S43: YES), or in other words, in the case where the ID signal has not been received within the monitored time, the CPU 11 determines whether or not the no-signal flag stored in the RAM 13 is set to 1 (S44).

In the case where the no-signal flag is not set to 1 (S44: NO), or in other words, before entering a phase of monitoring the reception of the following data signals, the CPU 11 moves the process to step S33 in order to re-execute the process from the reception of the first startup signal. However, in the case where the no-signal flag is set to 1 (S44: YES), the CPU 11 moves the process to step S72 (see FIG. 8), in which a no-signal timer (described later) continues counting time.

Moving to FIG. 7 from step S42 in FIG. 6, the CPU 11 verifies the identification information (ID) indicated by the reception content (the demodulation signal) from the reception unit 16 against the identification information of the portable machine 2 stored in the ROM 12 (S51) and determines whether or not the identification information matches (S52). In the case where the identification information does not match (S52: NO), the CPU 11 moves the process to step S42 (see FIG. 6) to ignore the received ID signal and repeat the determination as to whether or not the ID signal has been received.

In the case where the identification information matches (S52: YES), the CPU 11 starts the counting of the reception timer using the timer 14 (S53). Here, the reception timer is a timer for monitoring from when the ID signal is received to when M (see step S25 in FIG. 5) data signals have been received. The CPU 11 then determines whether or not a single data signal has been received (S54).

In the case where a single data signal has been received (S54: YES), the CPU 11 reads out the data serial number added to the reception content (the demodulation signal) from the reception unit 16 (S60), stores the read-out data serial number in the RAM 13 (S61), increments the number of data stored in the RAM 13 by 1 (S62), and clears the no-signal flag stored in the RAM 13 to 0 (S63). Then, the CPU 11 determines whether or not the number of data is the aforementioned first prescribed value (S64). In the case where the number of data is the first prescribed value (S64: YES), the CPU 11 executes the above-described first process (S65), and then moves the process to step S54.

In the case where the number of data is not the first prescribed value (S64: NO), the CPU 11 determines whether or not the number of data is the aforementioned second prescribed value (S66). In the case where the number of data is the second prescribed value (S66: YES), the CPU 11 executes the above-described second process (S67), and then ends the process of FIG. 7. On the other hand, in the case where the number of data is not the second prescribed value (S66: NO), the CPU 11 moves the process to step S54 to continue the reception of the data signal. Note that instead of counting the number of data, the time from when the first data signal is received to when the final data signal is received may be counted, and the processing may be executed in accordance with the length of the counted time.

In the case where the data signal is not received in step S54 (S54: NO), the CPU 11 determines whether or not the reception timer has finished counting time T23 (S55). In the case where M is 1, T23 is a time around 50 ms, for example. In the case where the reception timer has not finished counting the time T23 (S55: NO), the CPU 11 moves the process to step S54 in order to repeat the determination as to whether or not the data signal has been received.

On the other hand, in the case where the reception timer has counted the time T23 (S55: YES), or in other words, in the case where the data signal has not been received within the monitored time, the CPU 11 determines whether or not the number of data stored in the RAM 13, indicating the number of data signals received by that point in time, is 0 (S56). In the case where the number of data is 0 (S56: YES), the CPU 11 moves the process to step S33 (see FIG. 6) in order to re-execute the process from the determination as to whether the first startup signal has been detected.

However, in the case where the number of data is not 0 (S56: NO), or in other words, in the case where at least some of the transmitted data signals have been received, the CPU 11 determines whether or not the no-signal flag stored in the RAM 13 is cleared to 0 (S57).

In the case where the no-signal flag is cleared to 0 (S57: YES), that is, before entering the phase of monitoring the reception of the following data signals or in the case where the phase of monitoring has been entered and the data signal has already been received, the CPU 11 moves the process to step S70 (see FIG. 8). In the case where the no-signal flag is not cleared to 0 (S57: NO), or in other words, in the case where the phase of monitoring the reception of the following data signals has been entered by a data signal has not yet been received, the CPU 11 moves the process to step S72 (see FIG. 8), in which the counting by the no-signal timer (described later) continues.

Moving to FIG. 8 from step S57 in FIG. 7, the CPU 11 sets the no-signal flag stored in the RAM 13 to 1 (S70), and then starts the counting of the no-signal timer using the timer 14 (S71). The no-signal flag is a flag indicating that the phase of monitoring the reception of the following data signals has been entered but a data signal has not yet been received. The no-signal timer counts a monitoring time until the following data signal is received, and carries out the monitoring in two stages, which will be described later.

Next, the CPU 11 sets the reception unit 26 to the sleep state (S72), starts the count of the period timer using the timer 14 (S73), and furthermore starts the count of the search timer (S74). Here, the period timer counts a period in which a search for a result of detecting the second startup signal is repeated while waiting for the second startup signal, whereas the search timer counts an amount of time for which the result of detecting the second startup signal is searched for while the reception unit 26 is in the sleep state.

Next, the CPU 11 searches for a result of detecting the second startup signal by the startup signal detection circuit 17 and determines whether or not the second startup signal has been detected (S75). In the case where the second startup signal has been detected (S75: YES), the CPU 11 moves the process to that illustrated in FIG. 6, starting a countdown from time T42 for the reception timer using the timer 14 (S45) and then moving the process to step S41.

Returning to FIG. 8, in the case where the second startup signal is not detected in step S75 (S75: NO), the CPU 11 determines whether or not the search timer has counted time T41 (S76). The time T41 is a time around 10 ms, for example. In the case where the search timer has not counted the time T41 (S76: NO), the CPU 11 moves the process to step S75 in order to repeat the search for the result of detecting the second startup signal.

In the case where the search timer has counted the time T41 (S76: YES), the CPU 11 determines whether or not the period timer has counted the time T4 (150 ms, for example) (S77), and in the case where the period timer has not counted the time T4 (S77: NO), stands by until the time T4 has been counted. On the other hand, in the case where the period timer has counted the time T4 (S77: YES), the CPU 11 determines whether or not the no-signal timer has counted time T5 (S78). Here, the time T5 is a time longer than the transmission interval of the second startup signal, and preferably is a time approximately twice as long as the transmission interval.

In the case where the no-signal timer has not counted the time T5 (S78: NO), the CPU 11 moves the process to step S73 in order to search for the result of detecting the second startup signal again. On the other hand, in the case where the no-signal timer has counted the time T5 (S78: YES), the CPU 11 determines whether or not the number of data stored in the RAM 13, indicating the number of data signals received by that point in time, is 0 (S80).

In the case where the number of data is not 0 (S80: NO), or in other words, in the case where at least one of the transmitted data signals has been received, the CPU 11 executes processing in accordance with the number of data (S81), and sets the number of data stored in the RAM 13 to 0 (S82). A wireless signal received after this point in time is treated as a new wireless signal. The "processing carried out in accordance with the number of data" here refers to the first process and the second process executed depending on the result of comparing the number of data with the first prescribed value and the second prescribed value in steps S64 and S66, respectively, indicated in FIG. 7. No particular processing is executed in the case where the number of data is less than first prescribed value.

On the other hand, in the case where the number of data is 0 (S80: YES), or the process of step S82 has ended, the CPU 11 determines whether or not the no-signal timer has counted time T6 (S83). The time T6 is a time longer than the time T5, and preferably is a time of approximately 25 seconds, for example.

In the case where the no-signal timer has not counted the time T6 (S83: NO), the CPU 11 moves the process to step S73 in order to search for the result of detecting the second startup signal again. On the other hand, in the case where the no-signal timer has counted the time T6 (S83: YES), the CPU 11 moves the process to step S33 (see FIG. 6) in order to re-execute the process from the determination as to whether the first startup signal has been detected.

In the processing illustrated in FIGS. 5, 6, 7, and 8, the ID signal and the M data signals are transmitted and received separately. However, the ID signal and the M data signals may be transmitted and received together. In this case, the transmission content is the ID signal and the M data signal with the CRC code added thereto. The transmission content to which the CRC code has been added may be encrypted as well.

Specifically, in the processing illustrated in FIG. 5, the identification information to serve as the transmission content is prepared, and the control information and data serial number are added to the transmission content in step S21, without transmitting the ID signal in step S16. Furthermore, rather than transmitting the data signal in step S24, a process of adding the CRC code to the overall transmission content and carrying out predetermined encryption thereon, and a process of transmitting the ID signal and the M data signals altogether, may be inserted between steps S25 and 26.

Additionally, in the processing illustrated in FIGS. 6, 7, and 8, a determination as to whether or not the ID signal and the M data signals have been received together in step S42 of FIG. 6 is carried out. Then, a process of decoding the encrypted reception content and carrying out the CRC check is inserted before step S51 in FIG. 7, and the processes of steps S54 to S56 and steps S60 to S62 are omitted. A process of reading out the data serial number included in the Mth data signal from the reception content and storing that data serial number in the RAM 13, and a process of adding the number of received data signals (less than or equal to M) to the number of data stored in the RAM 13, may then be added.

According to the present embodiment as described above, in the case where the ID signal indicating the identification information (ID) corresponding to the vehicle C, and the more than M data signals (where M is a natural number) indicating control content corresponding to locking/unlocking the vehicle doors D or raising/lowering the windows, are included in a wireless signal and transmitted, the portable machine 2 adds the ID signal into the wireless signal each time M data signals are transmitted, and continues the transmission. Meanwhile, each time the vehicle-mounted machine 1 receives the ID signal included in the wireless signal being received, the vehicle-mounted machine 1 verifies the identification information indicated by the received ID signal against the identification information stored in the ROM 12, and continues to receive the wireless signal when there is a match.

Accordingly, the vehicle-mounted machine 1 uses the plurality of ID signals included in the wireless signal to confirm whether or not the portable machine 2 is correct each time during the reception of a wireless signal including more than M data signals, and the reception of the wireless signal is then continued.

Accordingly, even in the case where the reception of a wireless signal from the portable machine is interrupted for the vehicle-mounted machine 1, the vehicle-mounted machine 1 can continue to receive the wireless signal.

Additionally, according to the embodiment, each time the ID signal constituting the wireless signal is received during the reception of a wireless signal including more than M data signals, the vehicle-mounted machine 1 continues to receive the wireless signal on the basis of the received ID signal. As a result, the power window mechanism 4 is controlled in the case where a wireless signal including more than N (where N≥M) data signals has been received, unlike the case where a wireless signal including N or fewer data signals has been received, in which case the door lock mechanism 3 is controlled.

Accordingly, the reception of a wireless signal including more than N data signals can be continued as appropriate, and the power window mechanism 4 can be controlled so as to respond to the more than N data signals.

Furthermore, according to the embodiment, the portable machine 2 transmits the wireless signal including the ID signal and the data signal after first transmitting the first startup signal, for causing the vehicle-mounted machine 1 to receive the wireless signal, for the time T1. Meanwhile, the vehicle-mounted machine 1 stands by for the first startup signal in a period of the time T2 (where T2≤T1), and becomes able to receive the wireless signal following the first startup signal by receiving the first startup signal that has arrived while the vehicle-mounted machine 1 is standing by.

Accordingly, the vehicle-mounted machine 1 can transition to the so-called sleep mode in the period of the time T2 and reduce the amount of power consumed. Meanwhile, the portable machine 2 can put the vehicle-mounted machine 1, which has transitioned to the sleep mode, into a reception-capable state and cause the vehicle-mounted machine 1 to receive the wireless signal.

Furthermore, according to the embodiment, before continuing to transmit the wireless signal including the added ID signal, the portable machine 2 inserts the second startup signal, for causing the vehicle-mounted machine 1 to continue to receive the wireless signal currently being received, and transmits that second startup signal for the time T3. Meanwhile, in the case where the vehicle-mounted machine 1 has received the ID signal and the data signal included in the wireless signal that follows the first startup signal as a result of receiving the first startup signal that has arrived while the vehicle-mounted machine 1 is standing by, the vehicle-mounted machine 1 enters a state of standing by for the second startup signal in a period of the time T4 (where T4<T2 and T4≤T3). The vehicle-mounted machine 1 can receive the wireless signal following the second startup signal by receiving the second startup signal that has arrived while the vehicle-mounted machine 1 is standing by.

Accordingly, even in the case where the reception is temporarily interrupted while the vehicle-mounted machine 1 is receiving the wireless signal, the reception of the wireless signal following the second startup signal can be continued. Meanwhile, the portable machine 2 can put the vehicle-mounted machine 1, which is standing by for the second startup signal, into a reception-capable state and cause the vehicle-mounted machine 1 to continue to receive the wireless signal. Additionally, setting the time to stand by for the second startup signal (T4) to be shorter than the time to stand by for the first startup signal (T2) makes it possible for the vehicle-mounted machine 1 to resume reception in a short amount of time, even in the case where the reception has been interrupted.

Further still, according to the embodiment, the time T3 for which the portable machine 2 transmits the second startup signal is shorter than the time T1 for which the portable machine 2 transmits the first startup signal (T3<T1).

Accordingly, reducing the time T3 makes it possible to suppress a situation in which the reception interval for the two data signals received by the vehicle-mounted machine 1 before and after the second startup signal is prolonged.

Further still, according to the embodiment, in the case where the period in which the vehicle-mounted machine 1 does not receive the ID signal and the data signals while the wireless signal is being received continues for greater than or equal to the time T5, which is longer than the transmission interval of the second startup signal, the vehicle-mounted machine 1 ends the reception of the wireless signal and prepares to receive a new wireless signal.

Accordingly, the vehicle-mounted machine 1 can detect the end of the reception of the wireless signal after the time T5 has passed following the reception of the newest data signal. Additionally, in the case where the time for which the reception of the ID signal and the data signals is interrupted is less than the time T5, the wireless signal can continue to be received.

Further still, according to the embodiment, in the case where the period for which the ID signal and the data signals are not received while receiving the wireless signal continues for greater than or equal to the time T6, the vehicle-mounted machine 1 enters the state of standing by for the first startup signal in the period of the time T2. Then, upon receiving the first startup signal that has arrived while the vehicle-mounted machine 1 is standing by, the vehicle-mounted machine 1 enters a state in which the wireless signal following the first startup signal can be received.

Accordingly, the vehicle-mounted machine 1 can return from a state of standing by for the second startup signal, to the initial state of standing by for the first startup signal in the period of the time T2, after the time T6 has passed following the reception of the newest data signal.

Further still, according to the embodiment, in the case where a plurality of data signals are included in the wireless signal transmitted by the portable machine 2, information that sequentially increases or decreases is added to each data signal.

Accordingly, even in the case where the reception of the wireless signal is temporarily interrupted, the vehicle-mounted machine 1 can know the number of data signals included in the wireless signal on the basis of the data signal received last.

The invention claimed is:

1. A vehicle-mounted communication system comprising a portable machine and a vehicle-mounted machine, the portable machine transmitting a wireless signal including an ID signal expressing identification information corresponding to a vehicle and one or more data signals expressing control content relating to a vehicle-mounted device, and the vehicle-mounted machine controlling the vehicle-mounted device on the basis of the ID signal and data signal included in the wireless signal received from the portable machine, wherein in the case where the portable machine transmits the wireless signal including the ID signal and more than M (where M is a natural number satisfying M≥2) of the data signals, the data signals being identical to each other, the portable machine is configured to further add the ID signal M data signals and continue the transmission; and the vehicle-mounted machine is configured to continue receiving the wireless signal on the basis of the ID signals included in the wireless signal being received.

2. The vehicle-mounted communication system according to claim 1, wherein the vehicle-mounted machine is configured to, in the case where the vehicle-mounted machine has received a wireless signal including more than N (where N is a natural number satisfying N≥M) of the data signals, carry out control that is different from the control carried out in the case where a wireless signal including N or fewer of the data signals has been received.

3. The vehicle-mounted communication system according to claim 2, wherein the portable machine is configured to transmit, for a time T1 before the wireless signal, a first startup signal for causing the vehicle-mounted machine to receive the wireless signal; and the vehicle-mounted machine is configured to be able to receive the first startup signal and the wireless signal following the first startup signal in a period of a time T2 (where T2≤T1).

4. The vehicle-mounted communication system according to claim 2, wherein the portable machine is configured to, in the case of transmitting a wireless signal including a plurality of data signals, add information that sequentially increases or decreases to each of the data signals and then transmit the wireless signal.

5. The vehicle-mounted communication system according to claim 1, wherein the portable machine is configured to transmit, for a time T1 before the wireless signal, a first startup signal for causing the vehicle-mounted machine to receive the wireless signal; and the vehicle-mounted machine is configured to be able to receive the first startup signal and the wireless signal following the first startup signal in a period of a time T2 (where T2≤T1).

6. The vehicle-mounted communication system according to claim 5,
wherein the portable machine is configured to, in the case of transmitting a wireless signal including a plurality of data signals, add information that sequentially increases or decreases to each of the data signals and then transmit the wireless signal.

7. The vehicle-mounted communication system according to claim 1,
wherein the portable machine is configured to, in the case of transmitting a wireless signal including a plurality of data signals, add information that sequentially increases or decreases to each of the data signals and then transmit the wireless signal.

8. A vehicle-mounted communication system comprising a portable machine and a vehicle-mounted machine, the portable machine transmitting a wireless signal including an ID signal expressing identification information corresponding to a vehicle and one or more data signals expressing control content relating to a vehicle-mounted device, and the vehicle-mounted machine controlling the vehicle-mounted device on the basis of the ID signal and data signal included in the wireless signal received from the portable machine,
wherein in the case where the portable machine transmits the wireless signal including the ID signal and more than M (where M is a natural number) of the data signals, the portable machine is configured to further add the ID signal M data signals and continue the transmission; and
the vehicle-mounted machine is configured to continue receiving the wireless signal on the basis of the ID signals included in the wireless signal being received;
wherein the portable machine is configured to transmit, for a time T1 before the wireless signal, a first startup signal for causing the vehicle-mounted machine to receive the wireless signal; and
the vehicle-mounted machine is configured to be able to receive the first startup signal and the wireless signal following the first startup signal in a period of a time T2 (where T2≤T1); and
wherein the portable machine is configured to insert and transmit, for a time T3, a second startup signal for causing the vehicle-mounted machine to continue to receive the wireless signal, before further including the ID signal and continuing transmission; and
the vehicle-mounted machine is configured to be able to receive the second startup signal and the wireless signal following the second startup signal in a period of a time T4 (where T4<T2 and T4≤T3) in the case where the vehicle-mounted machine has received the wireless signal following the first startup signal and has received the ID signal and the data signal.

9. The vehicle-mounted communication system according to claim 8, wherein the time T3 satisfies a condition of T3<T1.

10. The vehicle-mounted communication system according to claim 9,
wherein the vehicle-mounted machine is configured to end the reception of the wireless signal in the case where the ID signal and the data signal to be included in the wireless signal being received have not been received for greater than or equal to a time T5 that is longer than a transmission interval of the second startup signal.

11. The vehicle-mounted communication system according to claim 9,
wherein the portable machine is configured to, in the case of transmitting a wireless signal including a plurality of data signals, add information that sequentially increases or decreases to each of the data signals and then transmit the wireless signal.

12. The vehicle-mounted communication system according to claim 8,
wherein the vehicle-mounted machine is configured to end the reception of the wireless signal in the case where the ID signal and the data signal to be included in the wireless signal being received have not been received for greater than or equal to a time T5 that is longer than a transmission interval of the second startup signal.

13. The vehicle-mounted communication system according to claim 12,
wherein the vehicle-mounted machine is configured to be able to receive the first startup signal and the wireless signal following the first startup signal in the period of the time T2 in the case where the ID signal and the data signal to be included in the wireless signal being received have not been received for greater than or equal to a time T6 (where T6>T5).

14. The vehicle-mounted communication system according to claim 13,
wherein the portable machine is configured to, in the case of transmitting a wireless signal including a plurality of data signals, add information that sequentially increases or decreases to each of the data signals and then transmit the wireless signal.

15. The vehicle-mounted communication system according to claim 12,
wherein the portable machine is configured to, in the case of transmitting a wireless signal including a plurality of data signals, add information that sequentially increases or decreases to each of the data signals and then transmit the wireless signal.

16. The vehicle-mounted communication system according to claim 8,
wherein the portable machine is configured to, in the case of transmitting a wireless signal including a plurality of data signals, add information that sequentially increases or decreases to each of the data signals and then transmit the wireless signal.

17. A vehicle-mounted machine that receives a wireless signal including an ID signal expressing identification information corresponding to a vehicle and one or more data signals expressing control content relating to a vehicle-mounted device, and controls the vehicle-mounted device on the basis of the data signal included in the received wireless signal, the vehicle-mounted machine being configured to:
be able to receive the first startup signal and the wireless signal following the first startup signal in a period of a time T2;
be able to receive a second startup signal and the wireless signal following the second startup signal in a period of a time T4 (where T4<T2) in the case where the wireless signal following the first startup signal, and the ID signal and the data signal, have been received; and continue receiving the wireless signal on the basis of the ID signal included in the wireless signal being received.

* * * * *